United States Patent
Schloegel et al.

(10) Patent No.: US 8,407,800 B2
(45) Date of Patent: Mar. 26, 2013

(54) METHOD FOR SOFTWARE VULNERABILITY FLOW ANALYSIS, GENERATION OF VULNERABILITY-COVERING CODE, AND MULTI-GENERATION OF FUNCTIONALLY-EQUIVALENT CODE

(75) Inventors: Kirk A. Schloegel, Minneapolis, MN (US); Devesh Bhatt, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 536 days.

(21) Appl. No.: 12/624,790

(22) Filed: Nov. 24, 2009

(65) Prior Publication Data

US 2011/0126288 A1     May 26, 2011

(51) Int. Cl.
*G06F 11/00*     (2006.01)
(52) U.S. Cl. ............................ 726/25; 717/104; 717/106
(58) Field of Classification Search .................. None
See application file for complete search history.

(56) References Cited

U.S. PATENT DOCUMENTS

| | | | |
|---|---|---|---|
| 5,485,409 A | 1/1996 | Gupta et al. | |
| 7,257,630 B2 | 8/2007 | Cole et al. | |
| 7,315,801 B1 | 1/2008 | Dowd et al. | |
| 7,325,252 B2 | 1/2008 | Bunker, V et al. | |
| 7,380,270 B2 | 5/2008 | Tracy et al. | |
| 2003/0023856 A1 | 1/2003 | Horne et al. | |
| 2007/0157311 A1 | 7/2007 | Meier et al. | |
| 2009/0113550 A1* | 4/2009 | Costa et al. | 726/25 |
| 2009/0144827 A1* | 6/2009 | Peinado et al. | 726/25 |
| 2010/0180344 A1* | 7/2010 | Malyshev et al. | 726/23 |

OTHER PUBLICATIONS

"Bestorm Fuzzer Whitepaper", "http://www.beyondsecurity.com/bestorm_whitepaper.html", accessed Sep. 3, 2009, pp. 1-3, Publisher: Beyond Security, Inc., Published in: McLean, VA.
"Black Box Testing", "http://www.beyondsecurity.com/black-box-testing.html", accessed Sep. 3, 2009, pp. 13, Publisher: Beyond Security, Inc., Published in: McLean, VA.

* cited by examiner

*Primary Examiner* — Fikremariam A Yalew
(74) *Attorney, Agent, or Firm* — Fogg & Powers LLC

(57) ABSTRACT

A method for detecting, analyzing, and mitigating vulnerabilities in software is provided. The method includes determining whether one or more vulnerabilities are present in one or more target software components, determining whether any detected vulnerabilities are fixable, and fixing the detected vulnerabilities that are fixable in code or in associated models used to generate code. A vulnerability-covering code is generated when one or more of the detected vulnerabilities are not fixable. A determination is then made whether there are any remaining vulnerabilities in the vulnerability-covering code. A vulnerability-aware diverse code is generated when there are one or more remaining vulnerabilities to obfuscate the remaining vulnerabilities.

15 Claims, 7 Drawing Sheets

METHOD FOR SOFTWARE VULNERABILITY FLOW ANALYSIS, GENERATION OF VULNERABILITY-COVERING CODE, AND MULTI-GENERATION OF FUNCTIONALLY-EQUIVALENT CODE

BACKGROUND

Software development and component integration can create subtle vulnerabilities within application software, middleware or operating systems, or across their interactions with system devices and external access points. Undetected vulnerabilities can be exploited to result in capability failures, unauthorized access to resources, or "Trojan horse" types of activities. Current debugging and testing tools have not been successful in detecting and eliminating such subtle vulnerabilities. However, hackers have been able to discover such subtle vulnerabilities, even though they often do not have access to source code or system designs.

Hackers typically use vulnerability models to analyze programs for vulnerabilities. Hackers look for security vulnerabilities by performing indirect searches of system robustness and correctness. That is, they postulate the existence of a particular vulnerability, create test cases to validate or invalidate the premise, and then run the tests and check the results. Such searches, while ad hoc, are guided by complex vulnerability models (that may exist only in the minds of the hackers) comprised of low-level, idiosyncratic knowledge of system routines, object interactions, operating system characteristics, and external interfaces, augmented with runtime diagnostic data.

Typical vulnerability discovery schemes locate only known vulnerabilities (i.e., they discover vulnerabilities after hackers do). Such schemes are limited by complexity as they search for single-statement or simple-pattern vulnerabilities at a single code module (e.g., class), object, or component. Furthermore, current approaches are ad hoc, that is, they apply a case-by-case representation and analysis to each type and location of vulnerability. This makes the current approaches incapable of detecting vulnerabilities that arise from interaction flow of multiple types and locations of vulnerabilities.

State-of-the-art system development methodologies are powerful enough to identify many classes of vulnerabilities through manual design/code reviews and testing. However, other classes of vulnerabilities pass through these processes undetected. For example, since most testing focuses on generating inputs and checking outputs, ephemeral vulnerabilities are often overlooked. Other vulnerabilities avoid detection because the design or code seems to be self-verifying. Thus, testing and review may be superfluous. Still other vulnerabilities that spring from the idiosyncrasies of system and library calls, object-oriented constructs and related runtime support, low-level operating system details, or object or other external interactions, can be extremely difficult to detect, especially when these vulnerabilities are due to counter-intuitive or nonsensical combinations of such activities.

Secure systems require that integrity be maintained not only in the face of a probabilistic injection of errors and statically analyzable data streams, but malicious and devious adversaries. Therefore, simple straight-line tests and analyses are not sufficient.

The recent increasing use of object-oriented software development mitigates some vulnerabilities by helping with incremental development, information abstraction, and encapsulation. Such object-oriented development, however, exposes additional vulnerabilities that can be used to exploit the object-oriented programming constructs and runtime support features.

Once a vulnerability is discovered, it may be too costly to completely remove the vulnerability through redesign, patching, or updating software. Instead, vulnerabilities may have to be managed throughout the system lifetime.

SUMMARY

A method and system for detecting, analyzing, and mitigating vulnerabilities in software is provided. The method includes determining whether one or more vulnerabilities are present in one or more target software components, determining whether any detected vulnerabilities are fixable, and fixing the detected vulnerabilities that are fixable in code or in associated models used to generate code. A vulnerability-covering code is generated when one or more of the detected vulnerabilities are not fixable. A determination is then made whether there are any remaining vulnerabilities in the vulnerability-covering code. A vulnerability-aware diverse code is generated when there are one or more remaining vulnerabilities to obfuscate the remaining vulnerabilities.

DRAWINGS

The drawings depict only representative embodiments of the invention and are not to be considered limiting in scope. These embodiments will be described with additional specificity and detail in the following description through the use of the referenced drawings, in which.

DETAILED DESCRIPTION

Figure 1A:
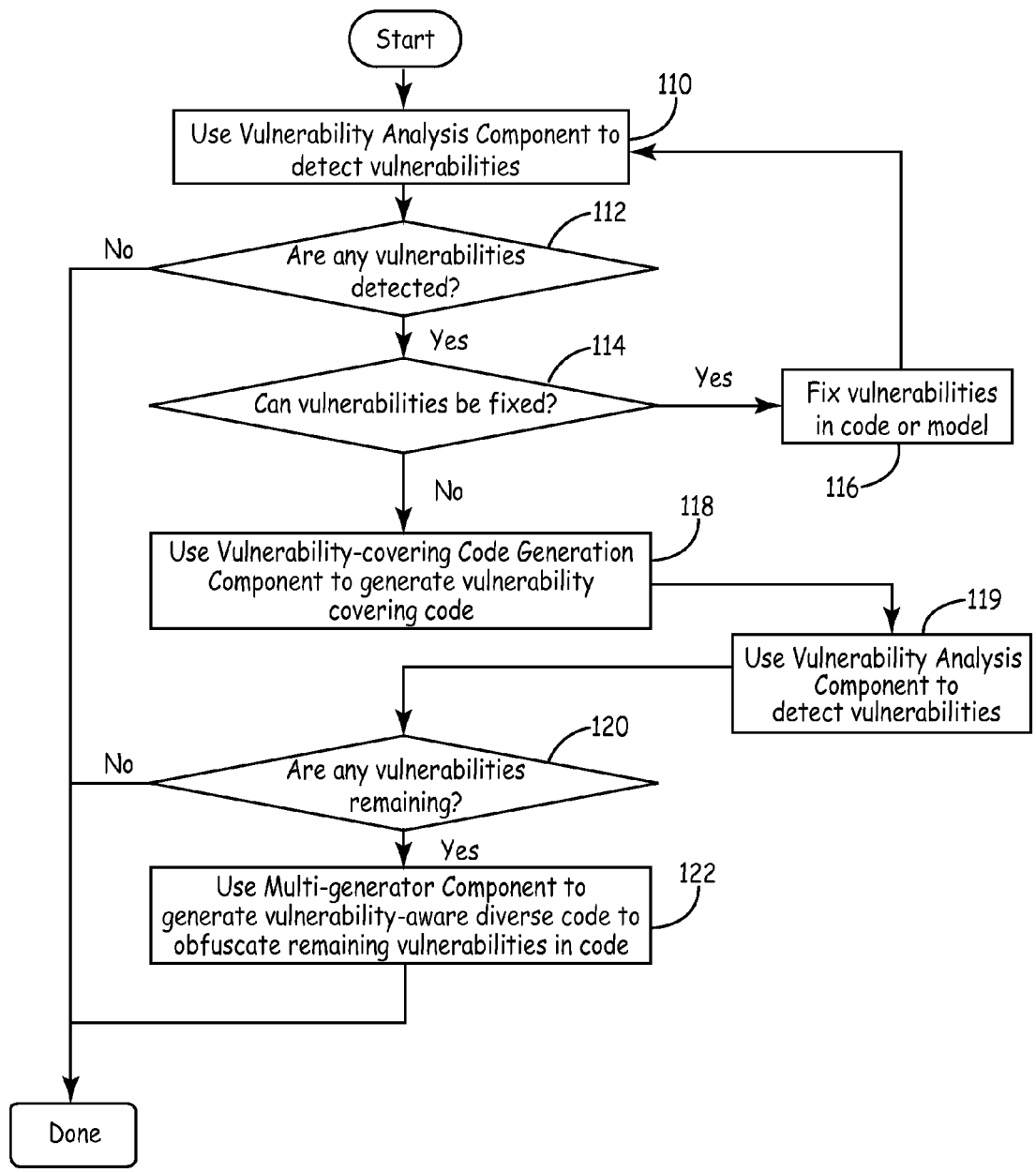
FIG. 1A is a flow diagram of a process for detecting and mitigating system and component vulnerabilities in software.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

The invention relates to a method and system for detecting and mitigating vulnerabilities in software by using vulnerability flow analysis, generation of vulnerability-covering code, and multi-generation of functionally-equivalent code. The present method can be used to discover subtle, complex vulnerabilities in software at both the component and system levels. The present approach also provides for enhancement of software tools for in-line and field assessment of integrated system integrity and vulnerability.

As used herein, the term "vulnerability" refers to an unspecified result or an unexpected condition plus a path to trigger and/or exploit the result or condition. Examples of vulnerability include buffer overflow, race condition, cascading failure, and the like. The detection of system vulnerabilities requires tracing vulnerability flows across hardware/software components and functional/non-functional properties.

The present approach applies usage assumption templates specific to particular classes of vulnerabilities to component models, and constructs a Vulnerability Flow Graph (VFG) of that component in an abstract generic representation. This allows the automated composition of multiple component Vulnerability Flow Graphs (VFGs) into a "master" system-level VFG that can then be formally analyzed for interaction flow across different types of vulnerabilities in multiple components. Thus, the present technique enables the discovery of new, complex, and subtle vulnerabilities before hackers can exploit such vulnerabilities.

A VFG is a specialized data flow graph with a number of output ports equal to the number of potential vulnerabilities in the system. If any combination of feasible input values can be found that results in a "true" value at an output, the corresponding vulnerability is present and exploitable.

In the present approach, VFGs can be automatically generated from available combinations of system and software design models, source code, rich execution traces, usage assumption templates, and hardware/architecture models and specifications.

The present approach is both extensible and leverages existing technological components, such as whole execution traces of programs, model-based design and code generation, and automated test generation.

The use of VFGs enable the static or dynamic detection of vulnerabilities that depend on complex interactions of idiosyncratic system or library calls, object-oriented constructs and related runtime support, operating system characteristics, and access attempts from external interfaces. Since VFGs are composable, they enable detection of vulnerabilities across external interfaces, components, and systems. In addition, since VFGs are specializations of data flow graphs, existing analysis tools and algorithms will work directly on them.

The present method applies VFGs to end-to-end range analysis and test generation algorithms to automatically discover vulnerabilities. The method can also apply VFGs to specialized code generation routines to result in both autogeneration of vulnerability-covering code and multi-generation of functionally-equivalent diverse (MUFFLED) code.

In general, the present approach can be implemented by developing data-flow or state chart model(s) of the required system behavior. The models can be specified in a number of ways, including source code, execution traces, and/or abstract or domain-specific models. The models are inputted into a VFG generation component to produce a VFG of the system. The VFG is then inputted into a vulnerability detection component to auto-detect any vulnerabilities. The behavioral models can be modified as necessary to eliminate none, some, or all of the vulnerabilities. If no vulnerabilities remain, models can be used to produce system implementation using any desired method (e.g., auto-generate source code from models). If vulnerabilities remain, then either vulnerability-covering code or multi-generate functionally equivalent diverse code can be generated as needed.

The present approach allows highly secure systems to be built by eliminating the propagation of failure modes, whether accidentally or maliciously inserted into the system. In addition, the present approach allows for highly-robust systems to be augmented, to protect against counter-intuitive and seemingly nonsensical error propagation streams that can result from complex flow and interaction of vulnerabilities in the system.

The present method and system are described in further detail hereafter with reference to the drawings.

FIG. 1A is a flow diagram of a process for detecting and mitigating system and component vulnerabilities in software according to the present approach. As shown in FIG. 1A, at the start, a vulnerability analysis component is used to detect vulnerabilities in a target software component (110). If no vulnerabilities are detected (112), the process is done. If vulnerabilities are detected, a determination is made whether the detected vulnerabilities can be fixed (114). If yes, the vulnerabilities are fixed in code or in associated models that are used to generate code (116), and the process returns to step 110. If the vulnerabilities cannot be fixed, a vulnerability-covering code generation component is used to generate vulnerability-covering code (118). The vulnerability analysis component is then used to detect vulnerabilities in vulnerability-covering code (119). If no vulnerabilities are detected (120), the process is done. If vulnerabilities are detected, a multi-generator component is used to generate vulnerability-aware diverse code to obfuscate remaining vulnerabilities in the code (122), and the process is then done.

Figure 1B:
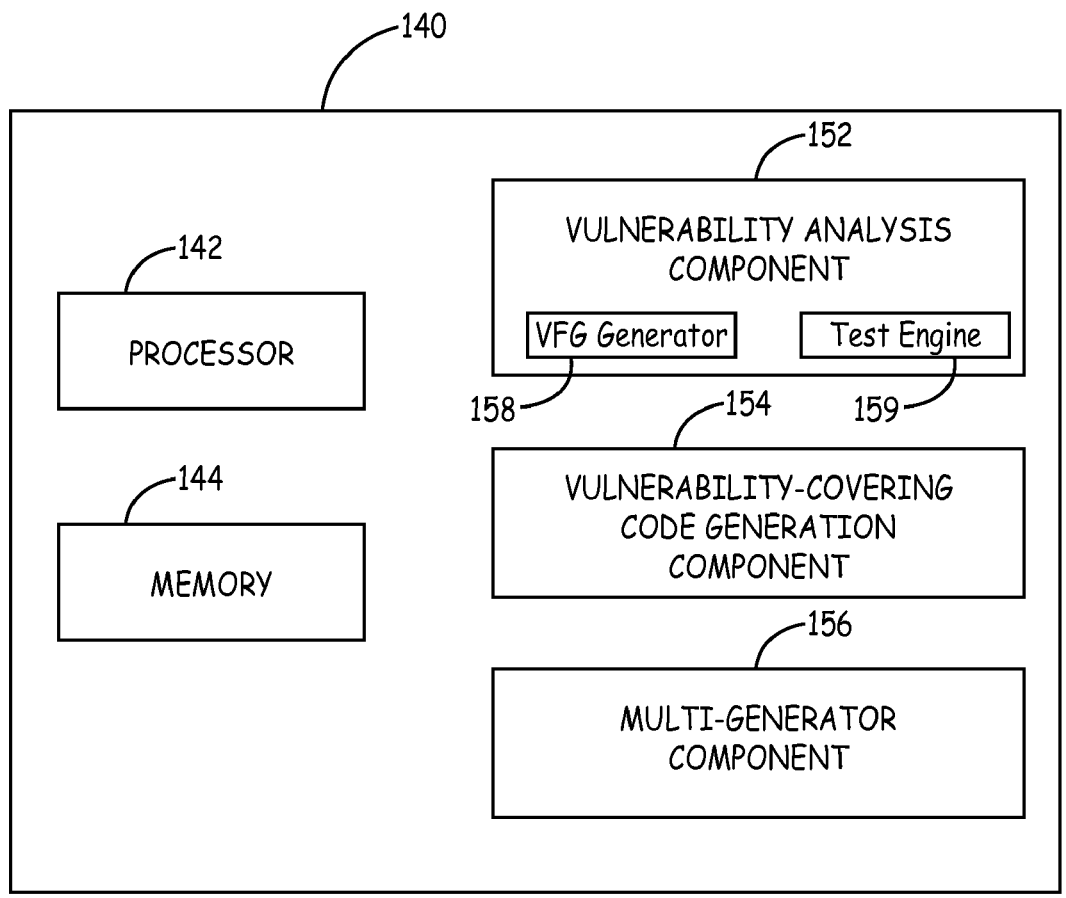
FIG. 1B is a block diagram of a system that can employ the process of FIG. 1A to detect and mitigate vulnerabilities.

FIG. 1B depicts a system 140 for detecting vulnerabilities that can employ the process of FIG. 1A. The system 140 includes at least one processor 142, and at least one memory device 144 in operative communication with the processor 142. The system 140 also includes a vulnerability analysis component 152, a vulnerability-covering code generation component 154, and a multi-generator component 156, which can be implemented as processor executable program instructions. The vulnerability analysis component 152 includes a VFG generator 158, and a VFG analysis and test generation engine 159, which are used to detect any vulnerabilities in one or more target software components. The vulnerability-covering code generation component 154 is configured to generate a vulnerability-covering code for any vulnerabilities that remain in the target software components after the previously detected vulnerabilities are fixed. The multi-generator component 156 is configured to generate vulnerability-aware diverse code to obfuscate any remaining vulnerabilities in the target software components not covered by the vulnerability-covering code.

Figure 2:
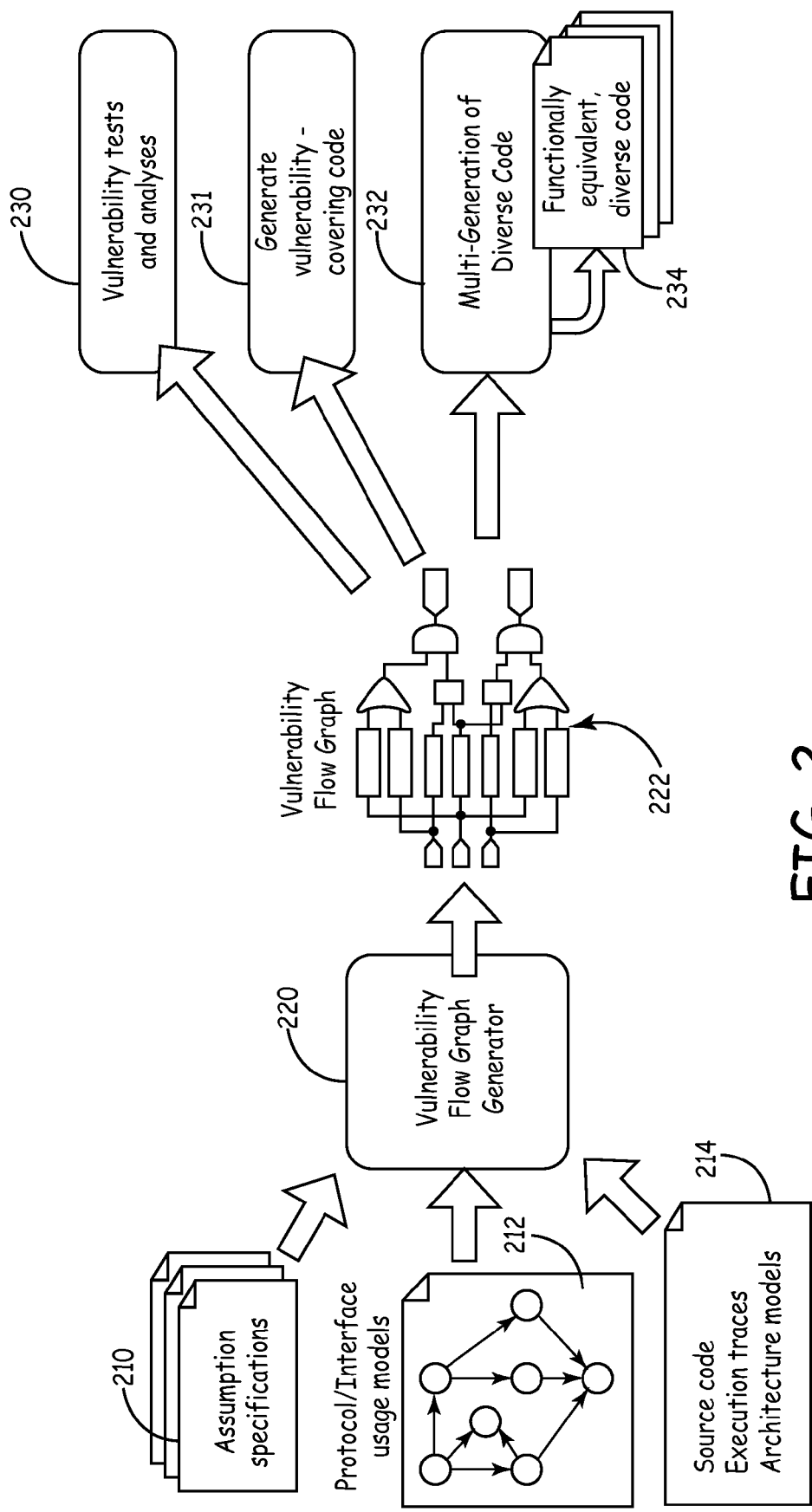
FIG. 2 is a block diagram of a method for automatically generating vulnerability flow graphs that are used for static and dynamic vulnerability analysis.

FIG. 2 illustrates the present technique for automatically generating vulnerability flow graphs that are used for static and dynamic vulnerability analysis. Initially, a set of usage assumptions associated with low-level system/library calls, programming abstractions (e.g., class inheritance, associations), interface protocols, and other operating system and platform-specific characteristics are specified as templates or models. For example, a collection of usage assumption specification sets 210 for various system and library subroutines can be constructed. The assumption specification sets 210 may be specified in a number of machine understandable ways (e.g., templates or formal models). This step has to be performed only once. The assumption specification sets 210 can then be applied to multiple components or systems as needed.

Next, the target software component or system is modeled using protocol/interface usage models 212, or other models 214 based on source code, rich execution traces, or architecture models and specifications. Many commercial off-the-shelf (COTS) and public domain tools are available to automatically reverse-engineer design models from source code. Certain models can also be generated automatically by capturing rich execution traces of the target software component under test conditions. Applicable architectural models often exist as Unified Modeling Language (UML) models of object-oriented design or other types of design documents.

The usage assumption specification sets and model(s) of the target software components or systems are then input into a vulnerability flow graph generator 220, which applies model-based design, analysis, and code generation techniques to automatically construct a vulnerability flow graph 222. The generated vulnerability flow graphs (VFGs) are hierarchically composable. Thus, VFGs can be created for each single component, and multiple component-level VFGs can be composed into a system-level VFG.

Automated test generation and analysis techniques are then applied to the VFGs to support automated development-time vulnerability testing and analysis at 230. In addition, automated model transformation techniques can be used to add vulnerability-covering structures to the VFGs. These structures can then be mapped to the original model or code to generate new vulnerability-covering code at 231. The VFGs can also be applied to the multi-generator component at 232 during development-time to generate functionally equivalent, diverse code at 234.

The foregoing features of the present approach are described in further detail as follows.

Assumptions and Vulnerabilities

Embedded systems are composed of diverse objects or components containing primitive statements and system, library, and user-defined subroutine calls, interfaces and ports. All of these have recommended usage patterns. Some also have undefined usages (e.g., C standard library routine strncpy (string copy) should not be called with overlapping objects). The set of recommended and undefined usage patterns can be considered the "usage assumption set" of the particular statement, call, or interface. For example, the C standard library routine fopen(const char *filename, const char *mode) might have an assumption set that includes, but is not limited to, case sensitivity of the filename. Also, strncpy (char *dst, const char *src, size_t n) has an assumption set that includes: (1) the dst and src arrays are at least of size n; (2) n>=0; and (3) src and dst arrays do not overlap.

Vulnerabilities occur when such assumptions can be violated maliciously (or attacked) from external objects, interfaces, or ports of a component. Therefore, a true vulnerability requires a connection between assumptions and external sources. For example, if the dst, src, and n parameters of a strncpy statement are defined independently of external data (i.e., system state, files, and input), the strncpy assumptions are not exploitable as vulnerabilities. On the other hand, the nature of the fopen routine (i.e., it interfaces with the file system) generally makes its usage assumption an exploitable vulnerability.

The present approach requires that such usage assumptions be specified in structured, machine understandable ways. A number of existing techniques are available to do so. For example, an important class of assumptions can be specified using template-based methods. Another class, including many interface protocols, can be specified as finite-state machines. Assumption sets are constructed once and can then be reused for each system analyzed. Furthermore, assumption sets can be easily updated and extended. Special-purpose sets can be defined to specify the idiosyncratic vulnerabilities of particular configurations, ephemeral states, etc.

Component and System Modeling

After a sufficient set of usage assumptions has been specified, vulnerability discovery of a particular system is begun by constructing a detailed model of the system. Similar information may already exist in the form of design products and documentation. However, manual effort to translate this information may be required. The construction of system models can be fully automated by using Whole Execution Traces (WET). A WET is a static, data-flow representation of a program that is labeled with extensive dynamic information. This unified representation is particularly well suited for vulnerability discovery. The static form relates external inputs to individual assumptions or structures of assumptions, while the dynamic information helps guide the search for test inputs that expose and confirm vulnerabilities. Other conventional static and dynamic trace tools can also be used to automate system model construction or likewise generate UML models from source code.

Vulnerability Flow Graph Generation

Existing model-based code generation techniques can be used to automatically construct VFGs given usage assumption sets and system models. Under this approach, system models are traversed in some manner (e.g., via breadth-first search). Each time a statement, remote method, or interface is encountered that has an assumption specification associated with it, that specification is used to incrementally build up the VFG. This is the same basic technique used for generating programming code given a UML object-oriented design model or data-flow graph.

Figure 3:
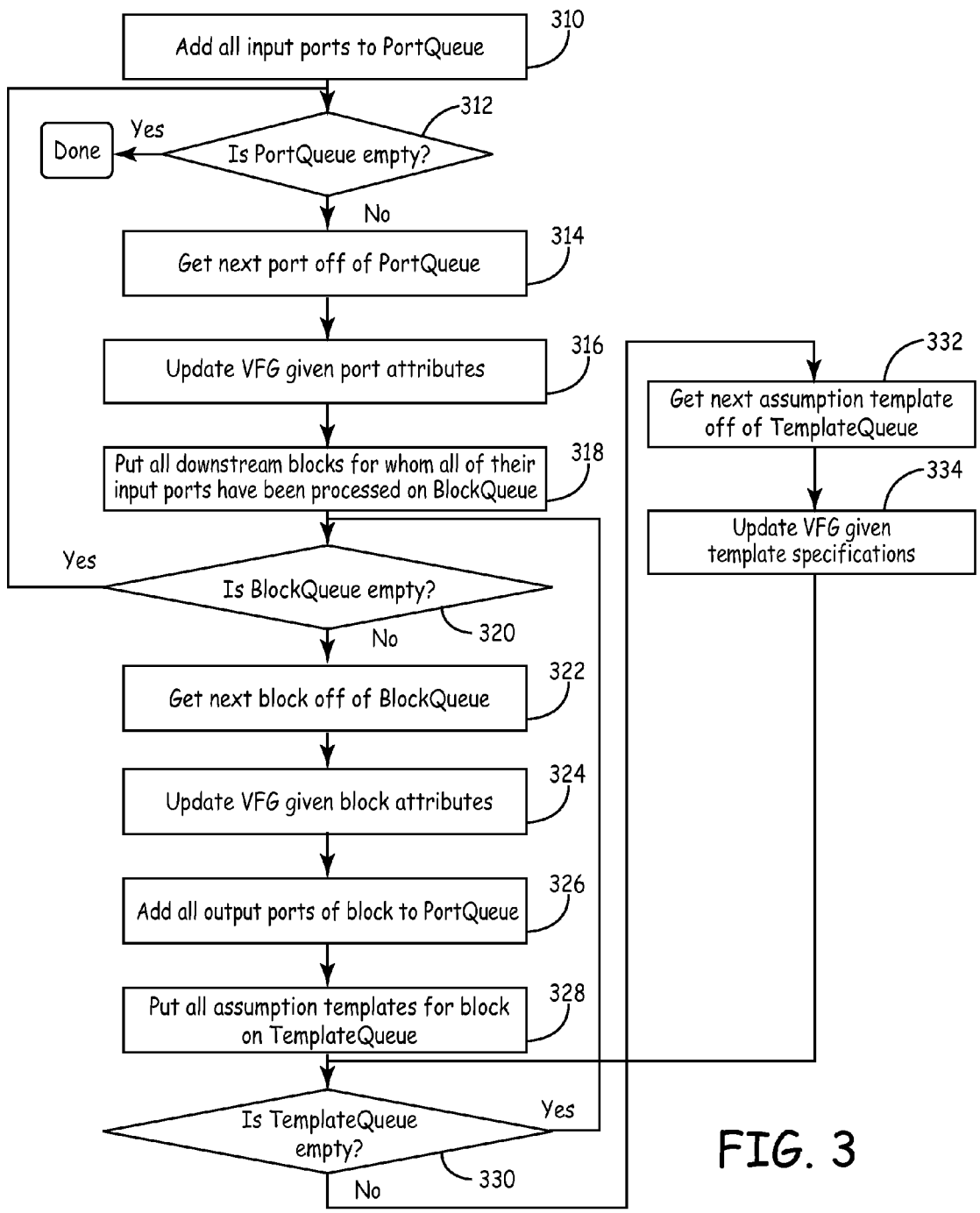
FIG. 3 is a flow diagram of a process for generating a vulnerability flow graph.

FIG. 3 is a flow diagram of a process for generating a vulnerability flow graph that can be employed by the vulnerability flow graph generator. Initially, all input ports are added to a Port Queue (310), and a determination is made whether the Port Queue is empty (312). If the Port Queue is empty, then the process is done. If the Port Queue is not empty, the process retrieves the next port off of the Port Queue (314), and a vulnerability flow graph is updated based on the given port attributes (316). The process then adds all downstream blocks for which all of their input ports have been processed in step 316 on a Block Queue (318). A determination is then made whether the Block Queue is empty at 320. If the Block Queue is empty, the process returns to step 312, and the foregoing steps are repeated until either the process is done or the Block Queue is not empty. If the Block Queue is not empty, the process gets the next block off of the Block Queue (322), and the VFG is updated based on the given block attributes (324). All output ports of the block are added to the Port Queue (326), and all usage assumption templates associated with the block are put on a Template Queue (328). A determination is then made whether the Template Queue is empty (330). If the Template Queue is empty, the process returns to step 320, and the foregoing steps are repeated as indicated until either the process is done or the Template Queue is not empty. If the Template Queue is not empty, the process gets the next usage assumption template off of the Template Queue (332), and the vulnerability flow graph is updated based on the given template specifications (334). The process then returns to step 330, and repeats the foregoing steps until the process is done.

Figure 4:
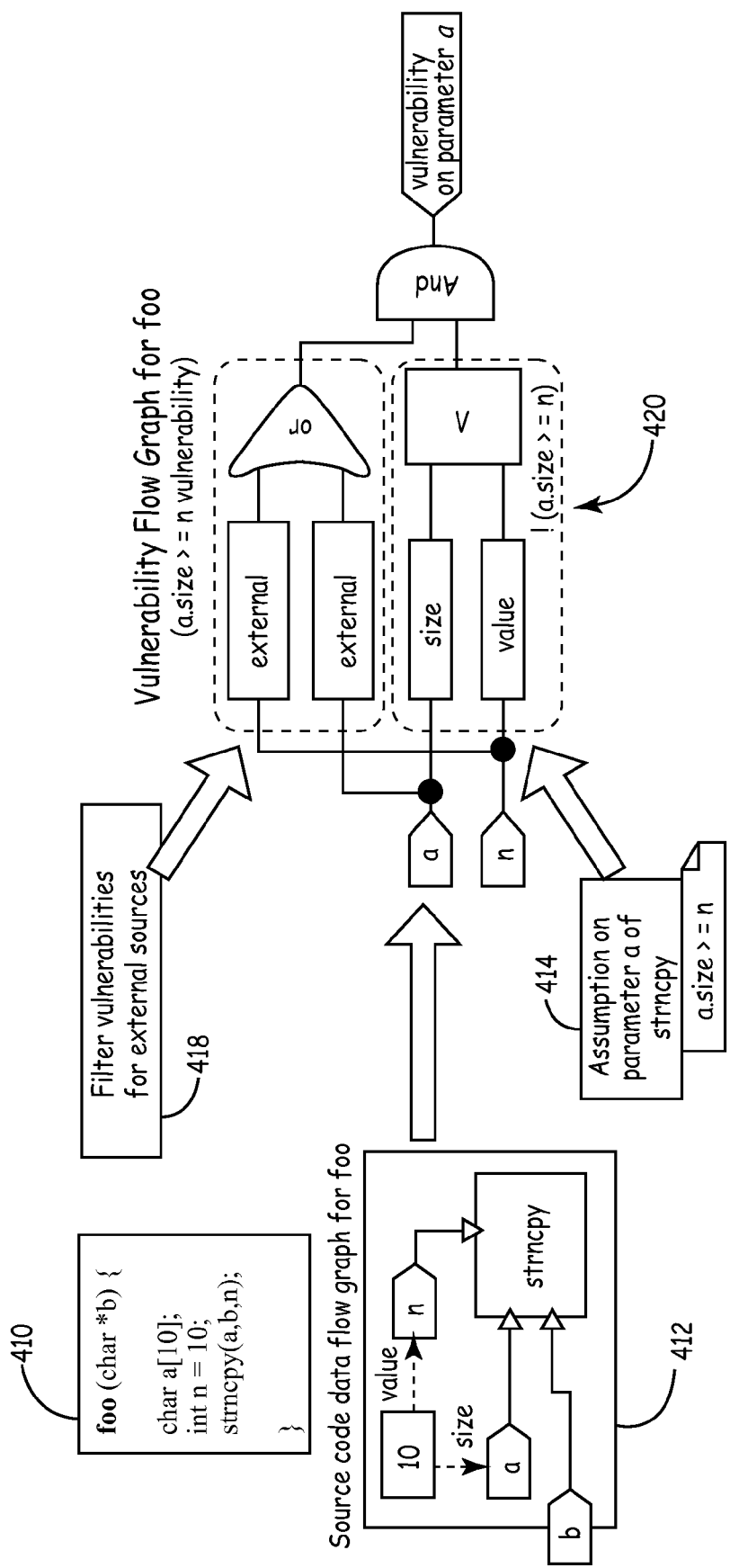
FIG. 4 is a block diagram showing how a test generation algorithm is applied to a vulnerability flow graph to expose or rule out vulnerabilities.

The block(s) referred to in the foregoing description with respect to FIG. 3 are the basic unit of computation in data flow diagrams, and essentially represent function calls. The blocks are shown in data flow diagrams as nodes, and can have different shapes. For example, as depicted in FIG. 4, the blocks are the OR and AND gates, the "external", "size" and "value" functions and the "less than" operator for a VFG 420. Every block has some number of input and/or output ports. The input ports are like the parameters that are passed into the function calls. The output ports carry the results of the function calls. So the AND gate in VFG 420 has two input ports (one for every wire that flows into it from the left side of the block) and one output port (one for every wire that flows out of it to the right side of the block).

Automated Vulnerability Testing and Analysis

After the VFG is generated, a test generation algorithm is applied to automatically search for ways in which assumptions can be violated from external sources. The purpose of test generation algorithms is to find sets of particular values of inputs, or sequences of sets of particular values of inputs, that result in specific graph internal nodes or outputs being set to particular values. Any sets of values of inputs that lead to a TRUE Boolean value on any of the outputs of a VFG indicates a vulnerability in the program.

Given a VFG, automated vulnerability testing and analyses can be performed using Honeywell's HiLiTE Verification Tool. The HiLiTE tool performs comprehensive analyses (e.g., range and type propagation, reachability analysis, model correctness, etc.) and auto-generates requirements-based test vectors on data flow diagrams. Since VFGs are specializations of data flow diagrams, the HiLiTE tool can be applied directly to discover the presence of vulnerabilities.

Auto-Generation of Vulnerability-Covering Code

The testing and analysis of VFGs can provide insights for automatically addressing detected vulnerabilities. Simple data flow structures (e.g., range limiter pattern) can be automatically added to the VFGs to close vulnerabilities. Code can be generated from the VFGs using the vulnerability-covering code generation component to produce a secured system. One technique that can be used is a pattern-based approach. Under this approach, for each vulnerability that is detected, an additional structure can be automatically added to the model that will constraint the feasible execution state such that the vulnerability can never be exploited. Then when code is generated from the model, the additional vulnerability-covering code will also be automatically generated due to the additional model structure.

Multi-Generation of Functionally-Equivalent Diverse Code

It may be that no feasible structures can be added to cover one or more of the discovered vulnerabilities. For example, this can be due to interactions across numerous variables resulting in complex and difficult-to-specify internal states. In these cases, VFGs can still be used to generate multiple versions of functionally-equivalent diverse code. This results in obfuscation of the remaining vulnerabilities that limit the application and lethalness of code-structure-dependent exploits.

The multi-generator component is configured to generate code that is both: (1) provably correct, and (2) widely and deeply diverse. Multi-generation of code can be utilized to show functional equivalence of multiple versions of code, for example, one version optimized for testability, the other optimized for performance. The multi-generated code can be shown to behave correctly within normal operating ranges, with the diversity of code targeted to abnormal ranges. Further details of this technique can be found in U.S. application Ser. No. 12/360,743 entitled "SYSTEM AND METHODS OF USING TEST POINTS AND SIGNAL OVERRIDES IN REQUIREMENTS-BASED TEST GENERATION" that was filed on Jan. 27, 2009, the disclosure of which is incorporated herein by reference.

Wide and deep code diversity can be enabled by targeted application of semantically-deep diversification techniques. The state space of feasible diversification options is vast, and vast regions of this space will not mask vulnerabilities. To prune this space, the multi-generator component is focused (i.e., "pivots") around the open vulnerabilities discovered in the VFGs and the particular values—or ranges of values—of variables that are required to exploit vulnerabilities. This "focused diversity" sharpens the effectiveness of the multi-generator component by enabling the use of more computationally-intensive, semantically-deep diversification techniques on smaller regions or cross-sections of code. For example, such techniques include model-to-instance proving theory, equivalence class calculus, and semantics-based model transformations.

Examples

The following examples illustrate various aspects of the present invention and are not intended to limit the scope thereof.

FIG. 4 illustrates an example of using a vulnerability flow graph to detect whether the unspecified result of a buffer overflow in a "strncpy" call embedded in a C code routine is exploitable. The source code for subroutine "foo" (410) is shown above a graphical representation of its execution trace that is specified as a data flow diagram (412). By applying the assumption template a.size>=n (414), the data flow diagram (412), and a vulnerabilities filter for external sources (418), a vulnerability flow graph (VFG) 420 with respect to the a.size>=n assumption may be constructed. The VFG 420 shows that when (1) a.size is less than the value of n, and (2) a or n (or both) have external sources, a vulnerability on parameter a is exposed.

Figure 5:
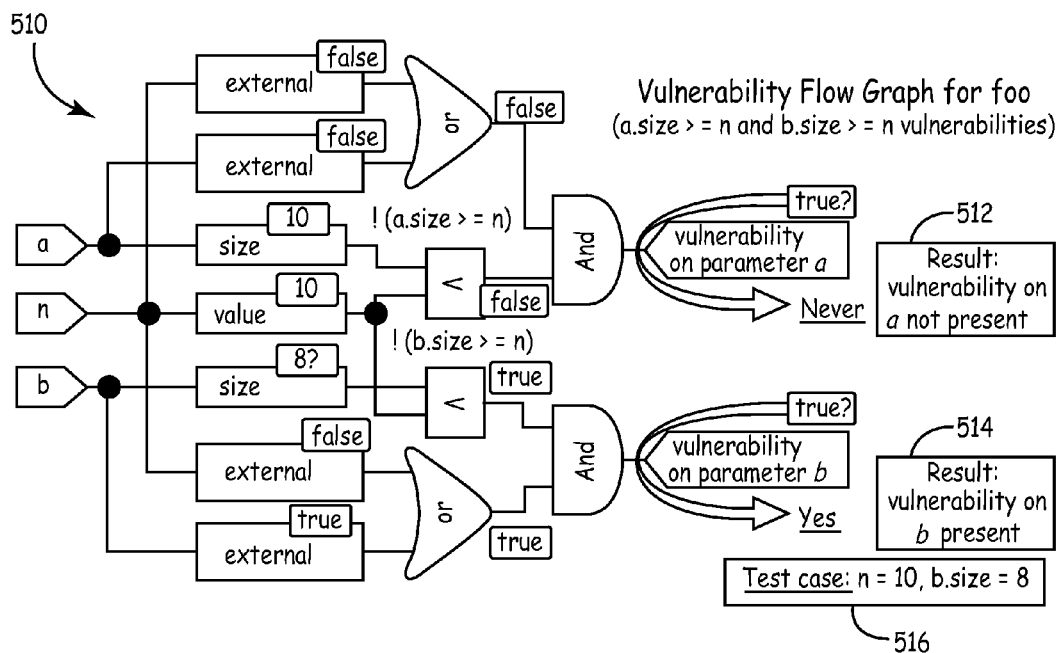
FIG. 5 depicts a vulnerability flow graph used by a test generation algorithm to find vulnerabilities and rule out other potential vulnerabilities.

FIG. 5 shows a VFG 510 for foo for both the a.size>=n and b.size>=n assumptions, and an example of how a test generation algorithm is applied to the VFG 510 to expose or rule out vulnerabilities. The test generation algorithm searches backwards through the VFG 510 for combinations of input values that will make one or more of the outputs true. If such a test case cannot be found (e.g., vulnerability on parameter a not present at 512), then the assumption is covered and the vulnerability is ruled out. If a test case is found (e.g., vulnerability on parameter b present at 514), the algorithm returns a test case 516 that exercises the vulnerability.

Figure 6:
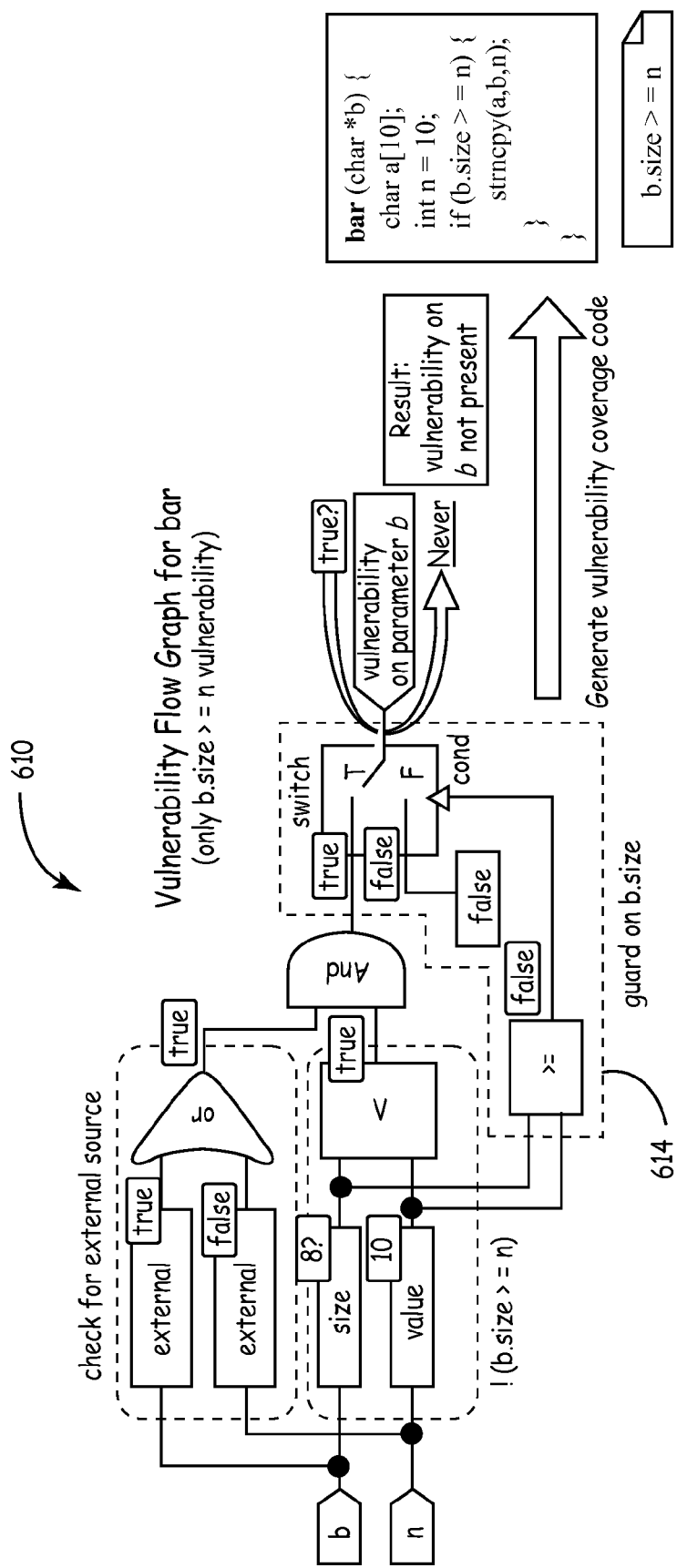
FIG. 6 depicts a vulnerability flow graph used by a test generation algorithm to automatically generate vulnerability covering code.

For each vulnerability detected, a vulnerability-covering structure may be automatically added to the vulnerability flow graph to produce a system in which the vulnerability cannot be exploited. FIG. 6 depicts a VFG 610 for a "bar" subroutine. The bar subroutine differs from the foo subroutine in that there is a vulnerability-covering structure 614 that constrains the value of b.size (implemented by the if structure) so that the vulnerability detected becomes infeasible. The test generation algorithm searches backwards through the modified VFG 610 for combinations of input values that will make one or more of the outputs true. If the test generation algorithm fails to find a "true" value for the b.size>=n vulnerability for the bar subroutine, the test generation scheme rules out this vulnerability. Since the bar subroutine covers the b.size>=n assumption, this subroutine is safe. A library of simple value-limiting structures can be developed. Rules can be developed to automatically insert the appropriate structures into VFGs whenever certain values are required to exploit a vulnerability.

A computer or processor used in the present approach can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The methods of the invention can be implemented by computer executable instructions, such as program modules or components, which are executed by a processor. Generally, program modules include routines, programs, objects, data components, data structures, algorithms, and the like, which perform particular tasks or implement particular abstract data types.

Instructions for carrying out the various process tasks, calculations, and generation of other data used in the operation of the method and system of the invention can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for detecting, analyzing, and mitigating vulnerabilities in software, the method comprising:
providing at least one processor; and
providing at least one memory device that stores program instructions executable by the processor to implement a method comprising:
determining whether one or more vulnerabilities are present in one or more target software components based on output from a vulnerability flow graph generator, wherein the vulnerability flow graph generator automatically generates one or more vulnerability flow graphs for static and dynamic vulnerability analysis;
determining whether any detected vulnerabilities are fixable;
fixing the detected vulnerabilities that are fixable in code or in associated models used to generate code;
generating a vulnerability-covering code when one or more of the detected vulnerabilities are not fixable, wherein the vulnerability-covering code is generated using the one or more vulnerability flow graphs;
determining whether there are any remaining vulnerabilities in the vulnerability-covering code; and
generating a vulnerability-aware diverse code when there are one or more remaining vulnerabilities to obfuscate the remaining vulnerabilities.

2. The method of claim 1, wherein the vulnerability flow graphs are automatically generated using a model-based code generation technique.

3. The method of claim 1, wherein the vulnerability flow graphs are hierarchically composable.

4. The method of claim 3, further comprising:
generating a vulnerability flow graph for each target software component to produce a plurality of component-level vulnerability flow graphs; and
composing a system-level vulnerability flow graph from the plurality of component-level vulnerability flow graphs.

5. The method of claim 1, further comprising:
constructing a collection of usage assumption specification sets; and
inputting the usage assumption specification sets into the vulnerability flow graph generator.

6. The method of claim 5, wherein the usage assumption specification sets comprise one or more templates or formal models.

7. The method of claim 5, further comprising:
constructing one or more models of the target software component; and
inputting the one or more models of the target software component into the vulnerability flow graph generator.

8. The method of claim 7, wherein the one or more models of the target software component is constructed using source code, reverse engineered unified modeling language models, rich execution traces, or architectural models.

9. The method of claim 1, further comprising:
applying one or more automated test generation techniques to the one or more vulnerability flow graphs to support automated development-time vulnerability testing and analysis.

10. The method of claim 1, wherein the vulnerability-aware diverse code is generated using the one or more vulnerability flow graphs.

11. A computer program product, comprising:
a non-transitory computer readable medium having program instructions that are executable to implement a method for detecting, analyzing, and mitigating vulnerabilities in software, the method comprising:
constructing a collection of usage assumption specification sets;
inputting the usage assumption specification sets into a vulnerability flow graph generator;
determining whether one or more vulnerabilities are present in one or more target software components based on output from the vulnerability flow graph generator;
determining whether any detected vulnerabilities are fixable;
fixing the detected vulnerabilities that are fixable in code or in associated models used to generate code;
generating a vulnerability-covering code when one or more of the detected vulnerabilities are not fixable;
determining whether there are any remaining vulnerabilities in the vulnerability-covering code; and
generating a vulnerability-aware diverse code when there are one or more remaining vulnerabilities to obfuscate the remaining vulnerabilities.

12. The computer program product of claim 11, wherein the vulnerability flow graph generator automatically generates one or more vulnerability flow graphs for static and dynamic vulnerability analysis.

13. A system comprising:
at least one processor;
at least one memory device in operative communication with the processor; and processor executable program instructions comprising:
a vulnerability analysis component configured to detect vulnerabilities in one or more target software components, the vulnerability analysis component comprising a vulnerability flow graph generator that automatically generates one or more vulnerability flow graphs for static and dynamic vulnerability analysis;
a vulnerability-covering code generation component configured to generate a vulnerability-covering code for remaining vulnerabilities in the target software components; and
a multi-generator component configured to generate vulnerability-aware diverse code to obfuscate any remaining vulnerabilities in the target software components not covered by the vulnerability-covering code;
wherein one or more automated test generation techniques are applied to the one or more vulnerability flow graphs to support automated development-time vulnerability testing and analysis.

14. The system of claim 13, wherein the vulnerability-covering code is generated using the one or more vulnerability flow graphs.

15. The system of claim 13, wherein the vulnerability analysis component further comprises a vulnerability flow graph analysis and test generation engine.

* * * * *